United States Patent
Lv

(10) Patent No.: US 9,843,183 B2
(45) Date of Patent: Dec. 12, 2017

(54) ESD PROTECTION CIRCUIT

(71) Applicant: SHANGHAI HUAHONG GRACE SEMICONDUCTOR MANUFACTURING CORPORATION, Shanghai (CN)

(72) Inventor: Bin Lv, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 226 days.

(21) Appl. No.: 14/977,012

(22) Filed: Dec. 21, 2015

(65) Prior Publication Data

US 2016/0308353 A1 Oct. 20, 2016

(30) Foreign Application Priority Data

Apr. 17, 2015 (CN) .......................... 2015 1 0185684

(51) Int. Cl.
*H02H 9/04* (2006.01)

(52) U.S. Cl.
CPC ................................. *H02H 9/046* (2013.01)

(58) Field of Classification Search
CPC ........... H02H 9/04; H02H 9/041; H02H 9/046
USPC ........................................................ 361/56
See application file for complete search history.

(56) References Cited

U.S. PATENT DOCUMENTS

| | | | |
|---|---|---|---|
| 2010/0290165 A1* | 11/2010 | Hartberger .......... | H01L 27/0285 361/56 |
| 2011/0241713 A1* | 10/2011 | Duarte De Martin ..................... | G01R 31/2884 324/755.01 |
| 2012/0257317 A1* | 10/2012 | Abou-Khalil ....... | H01L 27/0262 361/56 |
| 2013/0141823 A1* | 6/2013 | Di Sarro ................ | H02H 9/046 361/56 |
| 2013/0215539 A1* | 8/2013 | Chu ....................... | H02H 9/046 361/56 |
| 2015/0124360 A1* | 5/2015 | Jack .......................... | G06F 1/16 361/56 |
| 2016/0013636 A1* | 1/2016 | Cai .......................... | H02H 9/04 361/56 |

* cited by examiner

*Primary Examiner* — Dharti Patel
(74) *Attorney, Agent, or Firm* — Muncy, Geissler, Olds & Lowe, P.C.

(57) ABSTRACT

An ESD protection circuit is disclosed, in which an RC trigger circuit and a transmission gate are used for determination of ESD protection triggering, and a silicon-controlled rectifier for ESD current conductance. The RC trigger circuit and the transmission gate allow improved trigger efficiency. In addition, the silicon-controlled rectifier incorporates first and second resistors, which can be implemented to have very low resistance values and are therefore able to effectively prevent the occurrence of latch-up during normal operation, as well as pull-up and pull-down transistors which can make an additional contribution to latch-up inhibition when turned on.

8 Claims, 1 Drawing Sheet

ESD PROTECTION CIRCUIT

CROSS-REFERENCES TO RELATED APPLICATIONS

This application claims the priority of Chinese patent application number 201510185684.1, filed on Apr. 17, 2015, the entire contents of which are incorporated herein by reference.

TECHNICAL FIELD

The present invention relates to the field of integrated circuit (IC) design and manufacture and, more particularly, to electrostatic discharge (ESD) protection circuits.

BACKGROUND

With the integrated circuit (IC) fabrication technology developing to a stage where the device feature sizes reach deep-submicron dimensions, all circuit MOS devices are employed as lightly-doped drain (LDD) structures, and the silicide process has been widely used in the diffusion layers of such MOS devices. Meanwhile, in order to reduce the series resistance due to diffusion in gate polysilicon, synthesis of polycrystalline compounds is also employed. These fabrication process improvements can result in significant increases in IC operation speed and integration, along with the MOS device gate oxide layer being increasingly thinned due to the scaling down of the IC component. However, the improvements also lead to a significant disadvantage. Deep submicron ICs are more vulnerable to electrostatic discharge (ESD) strikes which can cause failure of the circuits, leading to lower reliability of products in which such ICs are used.

ESD is an event that transfers an amount of charge from one object (e.g., the human body) to another (e.g., a chip). The existing anti-ESD requirements with respect to ICs all mainly concern the protection of static electricity from human body, and the human-body model (HBM) has been established which is the earliest and one of the most commonly-used ESD models.

HBM simulates a discharge from an electrostatically charged person to an IC chip pin when the person touches the pin with the hand. Therefore, an ESD event often occurs within the IC's input and output units, and internal supply-to-ground paths as well. This event may cause a very large current flowing through the IC chip in a very short period of time. In fact, ESD events account for 35% or higher of the causes of chip failure.

ESD protection circuit is designed to prevent a working circuit from acting as an ESD path and thus being damaged by guaranteeing that, for any pin of the circuit, there is an appropriate low-impedance bypass for guiding the current caused by an ESD event occurring at the pin to the power line, which is then discharged through an ESD current path established by another pin.

Referring to FIG. 1, which is a schematic circuit diagram of a first ESD clamp of the prior art, including an RC trigger circuit formed of a resistor RI and a capacitor C1, a plurality of inverters 10 constituted by pMOS and nMOS transistors, and a discharge transistor 20. The discharge transistor 20 is realized as an nMOS transistor. As an ESD pulse is typically a high-voltage, high-frequency signal, the discharge transistor 20 is required to be a bulky device with a large footprint, which is conflictive with the high integration trend in this industry. In addition, the bulky discharge transistor 20 tends to be associated with a significant leakage current $I_{off}$ which may affect the proper operation of the circuit.

Referring to FIG. 2, which is a schematic circuit diagram of a second ESD clamp of the prior art. The ESD clamp depicted in FIG. 2 is a silicon-controlled rectifier (SCR) in which $N^+$ and $P^+$ regions are formed in an Nwell substrate, and $P^+$ and $N^+$ regions in a Pwell substrate. Additionally, two transistors T1 and T2 are also formed in the substrates. In this case, ESD protection triggering requires breakdown of the p-n junctions, which leads to low efficiency and low sensitivity. In addition, there is a possibility of latch-up occurring in the SCR, which poses an additional risk.

SUMMARY OF THE INVENTION

It is therefore the objective of the present invention to provide an electrostatic discharge (ESD) protection circuit with improved ESD protection trigger efficiency and reduced possibility of latch-up.

To this end, the present invention proposes an ESD protection circuit including: a trigger circuit, a plurality of inverters, a transmission gate, a first transistor, a second transistor, a first resistor, a second resistor, a pull-up transistor and a pull-down transistor, wherein the plurality of inverters are connected in series and include a leading inverter and a trailing inverter; the transmission gate includes an nMOS transistor and a pMOS transistor connected in parallel; the leading inverter has an input coupled to the trigger circuit; the trailing inverter has an output coupled to both a gate of the nMOS transistor of the transmission gate and a gate of the pull-up transistor; the trailing inverter has an input coupled to both a gate of the pMOS transistor of the transmission gate and a gate of the pull-down transistor; the first transistor has a base shorted with a collector of the second transistor; the second transistor has a base shorted with a collector of the first transistor; the second transistor has a collector coupled to an emitter of the first transistor via the first resistor, and the emitter of the first transistor is coupled to a power supply voltage; the first transistor has a collector coupled to an emitter of the second transistor via the second resistor, and the emitter of the second transistor is grounded; and the transmission gate has a first control terminal coupled to both a drain of the pull-up transistor and the base of the first transistor and has a second control terminal coupled to both a drain of the pull-down transistor and the base of the second transistor.

Further, in the ESD protection circuit, the plurality of inverters may include three series-connected inverters.

Further, the trigger circuit may be a circuit consisting of a resistor and a capacitor connected in series, wherein the input of the leading inverter is coupled between the resistor and the capacitor.

Further, in the ESD protection circuit, the trigger circuit may have a resistance-capacitance product ranging from 0 μS to 2 μS.

Further, in the ESD protection circuit, the pull-up transistor may be a pMOS transistor, and the pull-down transistor may be an nMOS transistor.

Further, in the ESD protection circuit, in normal operation, the transmission gate may be turned off, with both of the pull-up transistor and the pull-down transistor being turned on.

Further, in the ESD protection circuit, in the event of the trigger circuit being activated by an ESD current, the transmission gate may be turned on, wherein upon a voltage difference between the base and the emitter of the first transistor exceeding a threshold voltage of the first transistor and a voltage difference between the base and the emitter of the second transistor exceeding a threshold voltage of the second transistor, the first transistor and the second transistor are turned on and form a positive feedback loop to discharge the ESD current, concurrently with the pull-up transistor and the pull-down transistor being turned off.

Further, in the ESD protection circuit, the voltage difference between the base and the emitter of the first transistor and the voltage difference between the base and the emitter of the second transistor may be determined by a resistance ratio between the first resistor and the second resistor.

The present invention is beneficial over the prior art designs majorly in that, an RC trigger circuit and a transmission gate are used for determination of ESD protection triggering, and a silicon-controlled rectifier for ESD current conductance, wherein the RC trigger circuit and the transmission gate allow improved trigger efficiency, and the silicon-controlled rectifier incorporates first and second resistors, which can be implemented to have very low resistance values and are therefore able to effectively prevent the occurrence of latch-up during normal operation, as well as pull-up and pull-down transistors which can additionally contribute to latch-up inhibition when turned on.

DETAILED DESCRIPTION

Electrostatic discharge (ESD) protection circuits according to the present invention will be described in greater detail in the following description which presents preferred embodiments of the invention, in conjunction with the accompanying drawings. It is to be appreciated that those of skill in the art can make changes in the invention disclosed herein while still obtaining the beneficial results thereof. Therefore, the following description shall be construed as widely known by those skilled in the art rather than as limiting the invention.

For simplicity and clarity of illustration, not all features of the specific embodiments are described. Additionally, description and details of well-known functions and structures are omitted to avoid unnecessarily obscuring the invention. The development of any specific embodiment of the present invention includes specific decisions made to achieve the developer's specific goals, such as compliance with system related and business related constraints, which will vary from one implementation to another. Moreover, such a development effort might be complex and time-consuming but would nevertheless be a routine undertaking for those of ordinary skill in the art.

The present invention will be further described in the following paragraphs by way of example with reference to the accompanying drawings. Features and advantages of the invention will be more apparent from the following detailed description, and from the appended claims. Note that the accompanying drawings are provided in a very simplified form not necessarily presented to scale, with the only intention of facilitating convenience and clarity in explaining a few exemplary embodiments of the invention.

Figure 1:
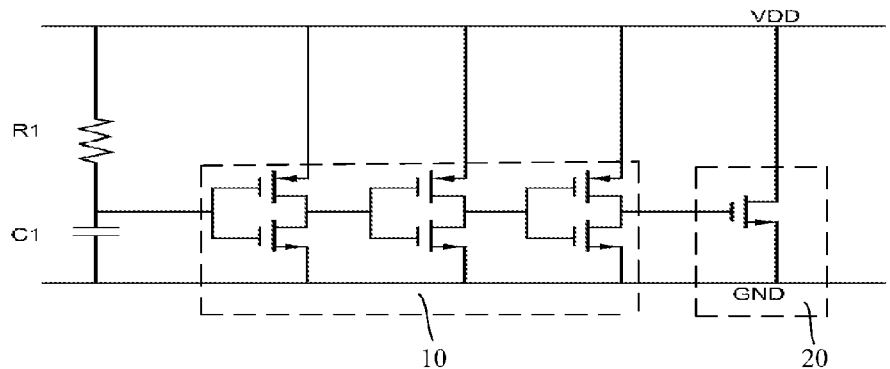
FIG. 1 is a schematic circuit diagram of a first ESD clamp of the prior art.
Figure 2:
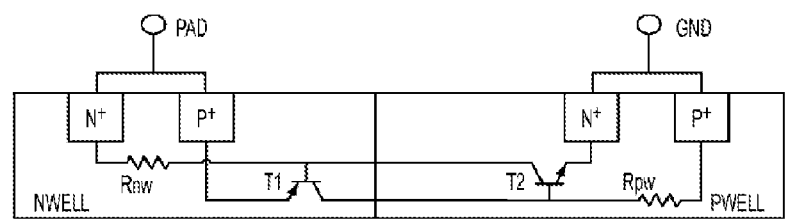
FIG. 2 is a schematic circuit diagram of a second ESD clamp of the prior art.
Figure 3:
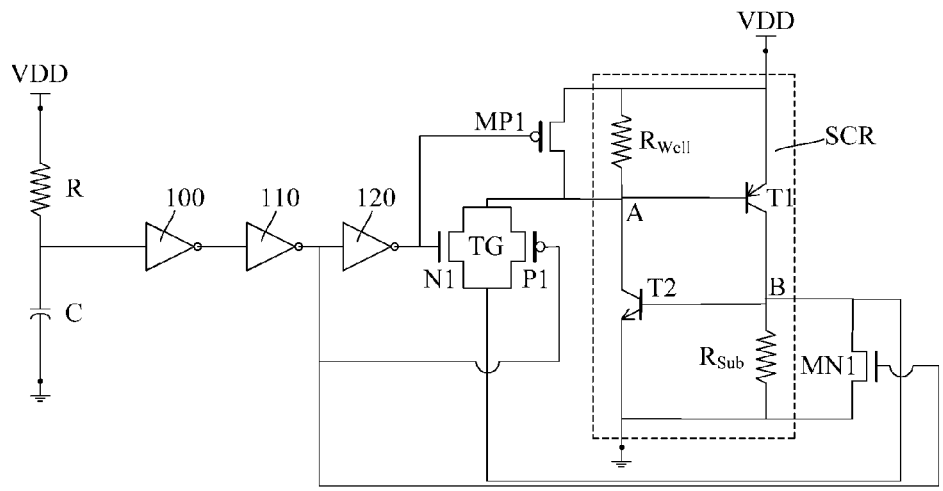
FIG. 3 diagrammatically illustrates an ESD protection circuit constructed in accordance with an embodiment of the present invention.

FIG. 3 shows an ESD protection circuit constructed in accordance with an embodiment of the present invention, which includes a trigger circuit, several inverters, a transmission gate TG; a first transistor T1, a second transistor T2, a first resistor $R_{well}$, a second resistor $R_{Sub}$, a pull-up transistor MP1 and a pull-down transistor MN1.

The trigger circuit consists of series-connected resistor R and capacitor C and has a resistance-capacitance product ranging from 0 μS to 2 μS, for example, 1 μS. In this embodiment, use of the RC trigger circuit enables quick identification of the presence of an ESD event and hence improved ESD protection trigger efficiency.

The several inverters are connected in series, including a leading inverter indicated at 100 and a trailing inverter indicated at 120. In this embodiment, there are preferably three inverters connected in series, which are the leading inverter 100, an intermediate inverter 110, and the trailing inverter 120. An input of the leading inverter 100 is coupled between the capacitor C and the resistor R. An output of the trailing inverter 120 is coupled to an nMOS transistor N1 of the transmission gate TG and a gate of the pull-up transistor MP1. An input of the trailing inverter 120 is coupled to a pMOS transistor P1 of the transmission gate TG and a gate of the pull-down transistor MN1. A base of the first transistor T1 is shorted with a collector of the second transistor T2, and a base of the second transistor T2 is shorted with a collector of the first transistor T1. The collector of the second transistor T2 is coupled to an emitter of the first transistor T1 and a power supply voltage VDD via the first resistor $R_{Well}$, and the emitter of the first transistor T1 is coupled to the power supply voltage VDD. The collector of the first transistor T1 is coupled to an emitter of the second transistor T2 via the second resistor $R_{Sub}$, and the emitter of the second transistor T2 is grounded. A first control terminal of the transmission gate TG is coupled to both a drain of the pull-up transistor MP1 and the base of the first transistor T1, and a second control terminal of the transmission gate TG is coupled to both a drain of the pull-down transistor MN1 and the base of the second transistor T2.

In this embodiment, the transmission gate TG is composed of the pMOS transistor P1 and the nMOS transistor N1 that are connected in series. The first resistor $R_{Well}$, the first transistor T1, the second transistor T2 and the second resistor $R_{Sub}$ constitute a silicon-controlled rectifier (SCR). The first resistor $R_{Well}$ and the second resistor $R_{Sub}$, represent the resistance values of the substrate and can be very low. This allows effective latch-up prevention in normal operation.

In addition, the pull-up transistor MP1 is implemented as a pMOS transistor, and the pull-down transistor MN1 as an nMOS transistor.

According to the present invention, the SCR parasitic $R_{Sub}$ and $R_{Well}$ are turned on or off to realize control of the SCR to trigger ESD protection. Specifically, upon an ESD event, the transmission gate TG is turned on, allowing a current to flow from the VDD terminal to $R_{Sub}$, to the transmission gate TG, to $R_{Well}$ and ultimately to the ground (GND). This decreases the voltage on the terminal A (the base of the first transistor T1) and raises the voltage on the terminal B (the base of the second transistor T2). When the difference between the voltages exceeds the base-emitter threshold voltage of the first and second transistors, the SCR is activated to discharge the ESD current. Concurrently, the pull-up transistor MP1 and the pull-down transistor MN1 are both turned off.

In normal operation, the transmission gate TG is turned off and there is no current flowing in the substrate. That is, there is no current in the $R_{Well}$ and the $R_{Sub}$. As a result, the SCR is not activated and always in an OFF state, and at the same time, the pull-up transistor MP1 and the pull-down transistor MN1 are both turned on.

According to the present invention, the $R_{Sub}$ and the $R_{Well}$ can both be designed to have a very low resistance value, so that latch-up is effectively prevented in normal operation. In addition, the turned-on pull-up transistor MP1 and the pull-down transistor MN1 can introduce an additional contribution to latch-up inhibition. In the ESD protection mode, the voltages on the A and B terminals are determined by a ratio between the $R_{Sub}$ and the $R_{Well}$, while enabling the ESD protection to be triggered properly. In addition, the ability of the SCR to conduct the ESD current is not affected by the turning off of the pull-up transistor MP1 and the pull-down transistor MN1.

In summary, in ESD protection circuits according to embodiments of the present invention, an RC trigger circuit and a transmission gate are used for determination of ESD protection triggering, and a silicon-controlled rectifier is used to discharge the ESD current. The RC trigger circuit allows improved trigger efficiency. In addition, the silicon-controlled rectifier incorporates first and second resistors, which can be implemented to both have a very low resistance value and are therefore able to effectively prevent the occurrence of latch-up during normal operation, as well as pull-up and pull-down transistors which can make an additional contribution to latch-up inhibition when turned on.

The foregoing description presents merely several preferred embodiments of the present invention and is not intended to limit the invention in any way. Any variations such as equivalent substitutions or modifications made to the subject matter or features disclosed herein by any person skilled in the art are all considered to be within the scope of the invention.

What is claimed is:

1. An ESD protection circuit, comprising: a trigger circuit, a plurality of inverters, a transmission gate, a first transistor, a second transistor, a first resistor, a second resistor, a pull-up transistor and a pull-down transistor, wherein: the plurality of inverters are connected in series and include a leading inverter and a trailing inverter; the transmission gate comprises an nMOS transistor and a pMOS transistor connected in parallel; the leading inverter has an input coupled to the trigger circuit; the trailing inverter has an output coupled to both a gate of the nMOS transistor of the transmission gate and a gate of the pull-up transistor; the trailing inverter has an input coupled to both a gate of the pMOS transistor of the transmission gate and a gate of the pull-down transistor; the first transistor has a base shorted with a collector of the second transistor; the second transistor has a base shorted with a collector of the first transistor; the second transistor has a collector coupled to an emitter of the first transistor via the first resistor, and the emitter of the first transistor is coupled to a power supply voltage; the first transistor has a collector coupled to an emitter of the second transistor via the second resistor, and the emitter of the second transistor is grounded; and the transmission gate has a first control terminal coupled to both a drain of the pull-up transistor and the base of the first transistor and has a second control terminal coupled to both a drain of the pull-down transistor and the base of the second transistor.

2. The ESD protection circuit according to claim 1, wherein the plurality of inverters comprise three series-connected inverters.

3. The ESD protection circuit according to claim 1, wherein the trigger circuit is a circuit consisting of a resistor and a capacitor connected in series, and the input of the leading inverter is coupled between the resistor and the capacitor.

4. The ESD protection circuit according to claim 3, wherein the trigger circuit has a resistance-capacitance product ranging from 0 µS to 2 µS.

5. The ESD protection circuit according to claim 1, wherein the pull-up transistor is pMOS transistor and the pull-down transistor is an nMOS transistor.

6. The ESD protection circuit according to claim 5, wherein in normal operation, the transmission gate is turned off, and both of the pull-up transistor and the pull-down transistor are turned on.

7. The ESD protection circuit according to claim 1, wherein in event of the trigger circuit being activated by an ESD current, the transmission gate is turned on, and upon a voltage difference between the base and the emitter of the first transistor exceeding a threshold voltage of the first transistor and a voltage difference between the base and the emitter of the second transistor exceeding a threshold voltage of the second transistor, the first transistor and the second transistor are turned on and form a positive feedback loop to discharge the ESD current, concurrently with the pull-up transistor and the pull-down transistor being turned off.

8. The ESD protection circuit according to claim 7, wherein the voltage difference between the base and the emitter of the first transistor and the voltage difference between the base and the emitter of the second transistor are determined by a resistance ratio between the first resistor and the second resistor.

* * * * *